(12) United States Patent
Jiang et al.

(10) Patent No.: US 11,550,821 B2
(45) Date of Patent: *Jan. 10, 2023

(54) ADAPTIVE RESOURCE ALLOCATION METHOD AND APPARATUS

(71) Applicant: Beijing OceanBase Technology Co., Ltd., Beijing (CN)

(72) Inventors: Zhiyong Jiang, Hangzhou (CN); Zhenkun Yang, Hangzhou (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,713

(22) Filed: Dec. 23, 2019

(65) Prior Publication Data

US 2020/0201885 A1 Jun. 25, 2020

Related U.S. Application Data

(63) Continuation of application No. 16/205,397, filed on Nov. 30, 2018, now Pat. No. 11,341,164, which is a
(Continued)

(30) Foreign Application Priority Data

Jun. 1, 2016 (CN) .......................... 201610382326.4

(51) Int. Cl.
  *G06F 16/00* (2019.01)
  *G06F 16/28* (2019.01)
  *H04L 67/60* (2022.01)

(52) U.S. Cl.
  CPC ............ *G06F 16/283* (2019.01); *H04L 67/60* (2022.05)

(58) Field of Classification Search
  CPC ........ G06F 9/465; G06F 9/505; G06F 16/283; H04L 67/60
  See application file for complete search history.

(56) References Cited

U.S. PATENT DOCUMENTS 8,667,385 B1   3/2014  Mui et al.
9,128,752 B2 *  9/2015  Aussagues ............ G06F 9/4843
              (Continued)

FOREIGN PATENT DOCUMENTS

CN         1606301        4/2005
CN       102083208        6/2011
              (Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Alexander Khong
(74) *Attorney, Agent, or Firm* — Fish & Richardson P.C.

(57) ABSTRACT

The present specification describes an adaptive resource allocation method and apparatus. One example method includes determining a request time, an execution time, and a response time corresponding to a service statement executed by the database system during a time period, wherein the request time is a time at which the service statement was executed by the database system, the execution time is an amount of time allocated for execution of the service statement by the database system, and the response time is an amount of time that elapsed between the request time and a time at which execution of the service statement ended; identifying a time segment of the time period based on the request time; determining a service type associated with the service statement; and updating a resource quota for
(Continued)

the time segment based on the service type, the execution time, and the response time for the service statement.

20 Claims, 6 Drawing Sheets

Related U.S. Application Data continuation of application No. PCT/CN2017/085285, filed on May 22, 2017.

(56) References Cited

U.S. PATENT DOCUMENTS

| | | | |
|---|---|---|---|
| 9,760,847 B2* | 9/2017 | Krebs | G06F 9/5072 |
| 2004/0013089 A1 | 1/2004 | Taneja et al. | |
| 2006/0200496 A1* | 9/2006 | Okman | G06Q 10/06 |
| 2007/0078829 A1* | 4/2007 | Stern | G06F 16/8373 |
| 2009/0172689 A1 | 7/2009 | Bobak et al. | |
| 2009/0307352 A1 | 12/2009 | Felton et al. | |
| 2014/0089511 A1 | 3/2014 | McLean | |
| 2014/0108212 A1 | 4/2014 | Cassel | |
| 2015/0379430 A1 | 12/2015 | Dirac et al. | |
| 2016/0381128 A1 | 12/2016 | Pai | |
| 2019/0102343 A1 | 4/2019 | Jiang et al. | |
| 2020/0265041 A1 | 8/2020 | Qiu | |

FOREIGN PATENT DOCUMENTS

| | | |
|---|---|---|
| CN | 103067297 | 4/2013 |
| CN | 104360905 | 2/2015 |
| CN | 104809070 | 7/2015 |
| JP | 2002082926 | 3/2002 |
| JP | 2002202959 | 7/2002 |

OTHER PUBLICATIONS

European Extended Search Report in European Patent Application No. 17805694.1, dated May 20, 2019, 7 pages.
International Preliminary Report on Patentability in International Application No. PCT/CN2017/085285, dated Dec. 4, 2018, 9 pages (with English Translation).
International Search Report by the International Searching Authority issued in International Application No. PCT/CN2017/085285 dated Jul. 27, 2017; 8 pages.
Nakamoto, "Bitcoin: A Peer-to-Peer Electronic Cash System," www.bitcoin.org, 2005, 9 pages.
Written Opinion in International Application No. PCT/CN2017/085285, dated Jul. 27, 2019, 8 pages (with English Translation).
Extended European Search Report in European Appln No. 21188934.0, dated Oct. 28, 2021, 7 pages.

* cited by examiner

ADAPTIVE RESOURCE ALLOCATION METHOD AND APPARATUS

CROSS-REFERENCE TO RELATED APPLICATIONS

This application is a continuation of U.S. application Ser. No. 16/205,397, filed on Nov. 30, 2018, which is a continuation of PCT Application No. PCT/CN2017/085285, filed on May 22, 2017, which claims priority to Chinese Patent Application No. 201610382326.4, filed on Jun. 1, 2016, and each application is hereby incorporated by reference in its entirety.

TECHNICAL FIELD

The present application pertains to the field of information processing technologies, and in particular, to an adaptive resource allocation method and apparatus.

BACKGROUND

An online transaction database generally refers to a database storing online transaction processing (OLTP) data. The online transaction database provides an online transaction service and the response time of a request can be sensitive.

A data warehouse generally refers to a database for providing an online analytical processing (OLAP) function and a business intelligence (BI) function. Compared with the online transaction database, the data warehouse features a very large data volume accessed by a request, and is not as sensitive to the response time.

Generally, a database system is used to meet two key service requirements. First, the database system is used to meet a requirement of a core online transaction service. In this case, the database system is required to support a transaction with an Atomicity, Consistency, Isolation, Durability (ACID) feature in short response time of a request, and needs a relatively high throughput. Second, the database system is used to meet a requirement of an analytical service such as data mining and BI. The analytical service has a relatively low requirement for a transaction. However, a data volume accessed by a single request is large (tens of thousands of lines, or even tens of millions of lines), and the statements are complex. A large quantity of resources are consumed when the single request is executed, and a response time is relatively long, ranging from several minutes to several hours. Because data in the data warehouse is usually periodically imported from the online transaction database, the data warehouse has poorer timeliness than the online transaction database.

Currently, in most enterprises, the previous two database systems (the online transaction database and the data warehouse) are mutually independent. The data in the online transaction database is periodically imported, by using an ETL system and tool, into the data warehouse for analysis. With the development of services, more users expect that a database system can support both an online transaction service and an analytical service, to reduce data transfer and redundant storage, meanwhile to analyze latest transaction data in real time.

A problem caused by the integration of the online transaction database and the data warehouse is that because of a limited total quantity of system resources and a large quantity of system resources constantly consumed by an analytical query request, an online transaction application is affected. For example, an online transaction very sensitive to a delay expires or is stocked, causing losses to a core service.

To resolve this problem, some database vendors provide solutions. A popular solution is to perform user resource management to statically set idle resource pools for different users. The resource pool includes resources such as a central processing unit (CPU), a memory, and input/output operations per second (IOPS). In a database system in which mixed services are deployed, different resource pools are configured for transaction service users and analytical service users. Mutual interference of resource usage can be basically eliminated for the two types of services in a system in which the solution is well implemented.

The static resource preconfiguration solution can partially resolve a problem of mutual interference between different types of services, but also has obvious disadvantages.

First, an administrator cannot properly allocate resources between different services. Proper resource allocation requires accurate measurement of resource consumption when the two types of services are executed. However, because of complexity and variability of a service, resource consumption is not a stable value. Instead, the resource consumption usually changes with time. A simple example is that each type of service has a peak period and an off-peak period. Allocation of the type of service determined based on a value in the service peak period is distinct from that determined based on a value in the service off-peak period.

Second, a preconfigured resource quota is not conducive to full utilization of resources. An online transaction service and an analytical service are used as an example. The two types of services both have obvious periodic characteristics. Regardless of special time points such as promotion, a peak period of the online transaction service is usually on day time, and an off-peak period of the online transaction service is usually at night. However, as the analytical service is usually for periodic statistics collection, for example, daily settlement or monthly settlement, a peak period of the analytical service is mostly at night.

Therefore, actual resource usage statuses of the online transaction service and the analytical service cannot be determined in advance in most situations. In addition, the two types of services both have a peak period and an off-peak period, and a resource requirement in the peak period is distinct from that in the off-peak period. It is very difficult for the system administrator to properly set resource quotas in advance.

A resource quota cannot be adjusted in real time based on a resource usage status in the conventional static resource preconfiguration solution. No effective solution to the problem is put forward currently.

SUMMARY

An objective of the present application is to provide an adaptive resource allocation method and apparatus, to adaptively adjust resource quotas of different types of services in different time segments and to ensure stable running of a core service and fully use system resources.

The present application provides an adaptive resource allocation method and apparatus.

An adaptive resource allocation method is provided, including: collecting statistics about a request time, an actual execution time, and a response time of each service statement in a time period; determining, based on the request time, a time segment of the time period to which each service statement belongs; and determining a type of each service statement, and adjusting resource quotas of different types of service statements in a same time segment of a next time period, based on the actual execution time and the response time of each service statement in each time segment.

An adaptive resource allocation apparatus is provided, including: a statistics collection unit, configured to collect statistics about a request time, an actual execution time, and a response time of each service statement during a time period; a division unit, configured to determine, based on the request time, a time segment of the time period to which each service statement belongs; a type determination unit, configured to determine a type of each service statement based on the actual execution time and the response time of each service statement in each time segment; and an adjustment unit, configured to adjust resource quotas of different types of service statements in a same time segment of a next time period.

Based on the adaptive resource allocation method and apparatus provided in the present application, a system can adaptively adjust a resource configuration ratio of different types of services in different time segments based on a service request type received during running time and load statuses of different types of service requests, to ensure stable running of a core service (for example, a transaction service) and fully use system resources.

BRIEF DESCRIPTION OF DRAWINGS

To describe technical solutions in implementations of the present application or in the existing technology more clearly, the following briefly describes the accompanying drawings required for describing the implementations or the existing technology. Apparently, the accompanying drawings in the following description merely show some implementations of the present application, and a person of ordinary skill in the art can still derive other drawings based on these accompanying drawings without creative efforts.

DESCRIPTION OF IMPLEMENTATIONS

To make a person skilled in the art better understand the technical solutions in the present application, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

The "first", "second", etc. used in the present specification are not particularly intended to indicate an order or a sequence, and are not intended to limit the present invention but only to distinguish between elements or operations described by using the same technical terms.

For resource allocation for a transaction service and an analytical service, because actual resource usage statuses of the two types of services cannot be predetermined in most situations, it is difficult for a system administrator to properly set resource quotas in advance. During actual running of the system, a time period of the transaction service can complement well to the analytical service. A solution better than the static resource preconfiguration allocation solution is to enable the system to dynamically adjust resource allocation based on the time periods of the services. In a peak period of the transaction service, more resources can be allocated to the transaction service, and a total quantity of resources used for the analytical service is limited; and in an off-peak period of the transaction service, more resources can be allocated to the analytical service for fully using the resources and quickly completing an analytical task, to obtain an analytical result for decision making. Based on the above, the present application provides an adaptive resource allocation method and apparatus.

Figure 1:
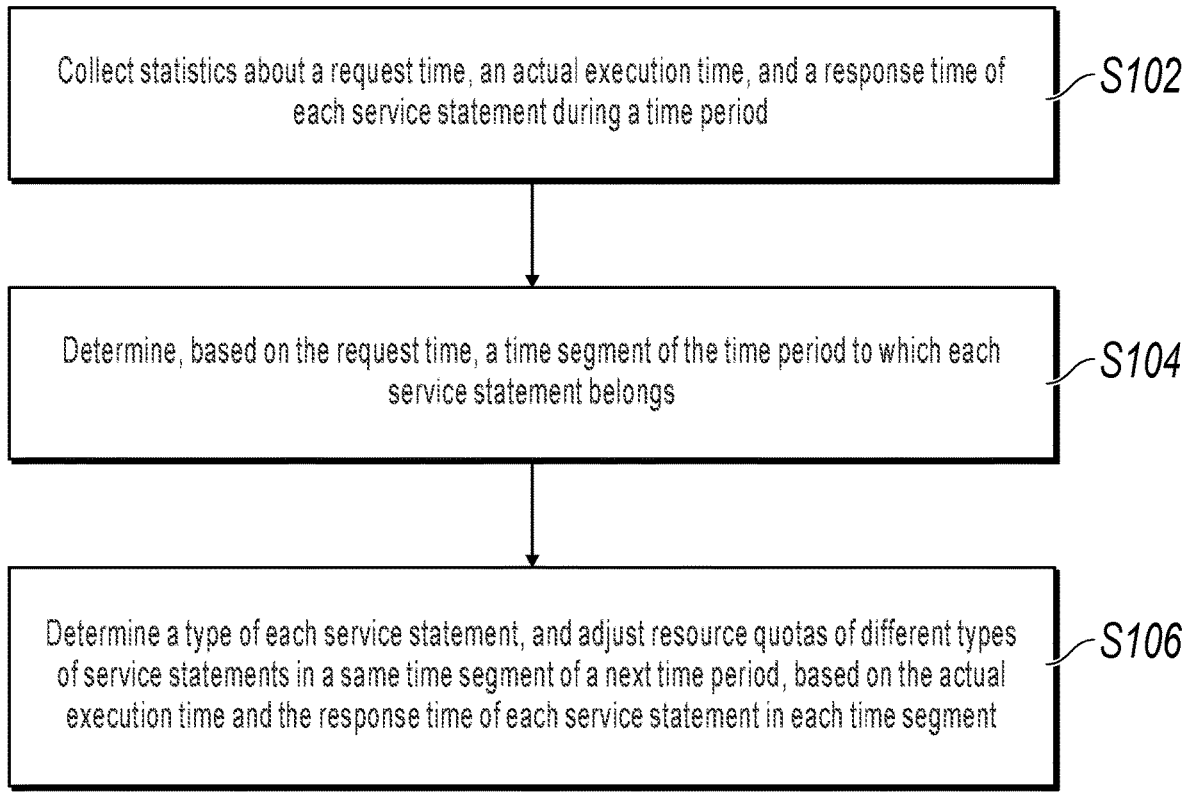
FIG. 1 is a method flowchart illustrating an implementation of an adaptive resource allocation method, according to the present application.

The following describes in detail the adaptive resource allocation method and apparatus in the present application with reference to the accompanying drawings. FIG. 1 is a method flowchart illustrating an implementation of an adaptive resource allocation method according to an implementation of the present application. Although the present application provides operation steps of the method or a structure of the apparatus shown in the following implementations or the accompanying drawings, the method or the apparatus can include more or fewer operation steps or module structures through conventional or non-creative efforts. For steps or structures that have no necessary logical causal relationship, an execution sequence of the steps or a module structure of the apparatus is not limited to an execution sequence or a module structure shown in the implementations of the present application. When the method or the module structure is executed by an apparatus or a terminal product in actual applications, the method or the module structure can be executed based on the sequence of the method or the module structure in the implementations or accompanying drawings or can be executed in parallel (for example, a parallel processor or a multi-threading environment). As shown in FIG. 1, an implementation of the adaptive resource allocation method provided in the present application can include the following:

Step S102: Collect statistics about a request time, an actual execution time, and a response time of each service statement during a time period.

Step S104: Determine, based on the request time, a time segment of the time period to which each service statement belongs. To be specific, when a time segment of the request time of each service statement is determined, determine that the service statement belongs to the time segment.

Step S106: Determine the type of each service statement, and adjust resource quotas of different types of service statements in the same time segment of the next time period, based on the actual execution time and the response time of each service statement in each time segment.

Based on the adaptive resource allocation method, a system can adaptively adjust a resource configuration ratio of different types of services in different time segments based on a service request type received during running time and load statuses of different types of service requests, to ensure stable running of a core service (for example, a transaction service) and fully use system resources.

Generally, the time period can be set to one day including 24 time segments, and each time segment is 1 hour. Alternatively, the time period can be set to one week, and each time segment is one day; or the time period can be set to one month, and each time segment is one day; or the time period can be set to one year, and each time segment is one month. Certainly, specific duration of a time period and a corresponding time segment can be set based on actual needs. The present application sets no limitation thereto. Generally, shorter duration of the time period and shorter duration of the corresponding time segment indicate higher accuracy that the system adaptively allocates resources.

In the present application, the types of the service statements can include a transaction service statement and an analytical service statement. Certainly, the types of the service statements can further include another type of service statement, which can be set based on actual needs. If a resource quota of another type of service statement needs to be adaptively adjusted, the adaptive resource allocation method is also applicable to a specific implementation. The transaction service statement and the analytical service statement are mainly used as examples for description in the present application.

After the time segment to which each service statement belongs is determined, the type of each service statement can be determined based on the actual execution time of each service statement in each time segment by using the following preferred implementation: determining whether the actual execution time of each service statement in each time segment is greater than an execution time threshold; and if yes, determining that the service statement is an analytical service statement; or if no, determining that the service statement is a transaction service statement. In the previous preferred implementation, the type of the service statement can be quickly and accurately determined, and the execution time threshold can be set or adjusted based on an actual situation.

After the type of each service statement is determined, the resource quotas of the different types of service statements in the same time segment of the next time period can be adjusted based on the actual execution time and the response time of each service statement in each time segment by using the following preferred implementation:

Step 1: Calculate a sum of actual execution times of all transaction service statements in each time segment, to obtain a first actual execution time sum in each time segment; and calculate a sum of response times of all the transaction service statements in each time segment, to obtain a first response time sum in each time segment.

Step 2: Calculate a sum of actual execution times of all analytical service statements in each time segment, to obtain a second actual execution time sum in each time segment; and calculate a sum of response times of all the analytical service statements in each time segment, to obtain a second response time sum in each time segment.

Step 3: Adjust a resource quota of the transaction service statements and a resource quota of the analytical service statements in the same time segment of the next time period based on the first actual execution time sum, the first response time sum, the second actual execution time sum, and the second response time sum.

Specific operations of the third step can be implemented by using the following preferred implementation: determine whether the first response time sum is greater than the first actual execution time sum; and if yes, determine that the resource quota of the transaction service statements is excessively small, and reduce the resource quota of the analytical service statements, for example, reduce the resource quota of the analytical service statements to a predetermined minimum resource quota of the analytical service statements; and determine whether the second response time sum is greater than the second actual execution time sum; and if yes, determine that the resource quota of the analytical service statements is excessively small, and reduce the resource quota of the transaction service statements, for example, reduce the resource quota of the transaction service statements to be greater than or equal to the larger of the following: a predetermined minimum resource quota of the transaction service statement and a resource quota actually consumed during the first actual execution time period.

The minimum resource quota of the analytical service statement and the minimum resource quota of the transaction service statement can be set or adjusted based on actual needs.

In the previous preferred implementation, the system can adaptively adjust resource quotas of different types of service statements based on load statuses of different types of service statements. Therefore, a resource quota adjustment operation is relatively accurately performed, to fully use system resources, ensure smooth running of different types of services, and reduce wasting of resources.

It is worthwhile to note that different types of services can have different levels of importance in different application scenarios. For example, during promotion, smooth running of a transaction service needs to be preferentially ensured. In view of this, the present application provides a preferred implementation to prioritize the transaction service statement and the analytical service statement. The transaction service statement has a higher priority than the analytical service statement. In a specific scenario, if a request amount of the transaction service statement in a predetermined time exceeds a threshold, a resource quota of the analytical service statement is reduced to zero until the request amount of the transaction service statement is less than the threshold. The threshold can be set or adjusted based on actual needs. In the previous preferred implementation, different types of service statements can be prioritized based on importance degrees of the different types of services, to ensure that a type of service is preferentially run in some specific scenarios. Generally, the priority of the transaction service statement and the priority of the analytical service statement are set by a system administrator, and the administrator performs prioritization based on service types mainly supported by the system.

In addition, when the system resources are insufficient, a certain type of service can be preferentially selected for running based on priorities of different types of services. In view of this, the present application provides a preferred implementation to prioritize the transaction service statement and the analytical service statement; and when a quantity of system resources is less than a resource threshold, allocate a resource quota to a service statement with a high priority and/or reduce a resource quota of a service statement with a low priority to zero.

Based on the same inventive concept as the previous adaptive resource allocation method, this application provides an adaptive resource allocation apparatus as described in the following implementation. Considering that the adaptive resource allocation apparatus has a similar problem resolving principle as the adaptive resource allocation method, reference can be made to the implementation of the adaptive resource allocation method for the implementation of the adaptive resource allocation apparatus. No repeated description is provided.

Figure 2:
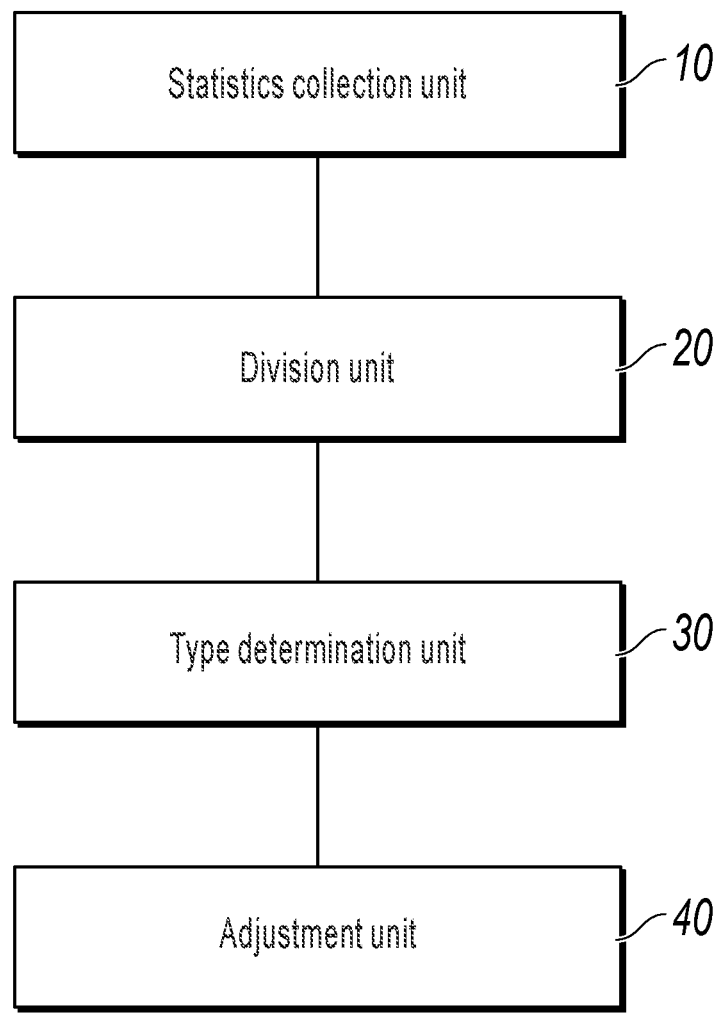
FIG. 2 is a schematic structural diagram illustrating an implementation of an adaptive resource allocation apparatus, according to the present application.

FIG. 2 is a schematic structural diagram illustrating an implementation of an adaptive resource allocation apparatus, according to the present application. As shown in FIG. 2, the apparatus can include a statistics collection unit 10, a division unit 20, a type determination unit 30, and an adjustment unit 40.

The statistics collection unit 10 is configured to collect statistics about a request time, an actual execution time, and a response time of each service statement during a time period. The statistics collection unit 10 is a part for collecting time information in the adaptive resource allocation apparatus, and can be software, hardware, or a combination thereof, for example, a component such as an input/output interface or a processing chip that implements a time information collection function.

The division unit 20 is configured to determine, based on the request time, a time segment of the time period to which each service statement belongs. The division unit 20 is a part for determining a time segment in the adaptive resource allocation apparatus, and can be software, hardware, or a combination thereof, for example, a component such as an input/output interface or a processing chip that implements a time segment determining function.

The type determination unit 30 is configured to determine a type of each service statement based on the actual execution time and the response time of each service statement in each time segment. The type determination unit 30 is a part for determining a time segment in the adaptive resource allocation apparatus, and can be software, hardware, or a combination thereof, for example, a component such as an input/output interface or a processing chip that implements a time segment determining function.

The adjustment unit 40 is configured to adjust resource quotas of different types of service statements in a same time segment of a next time period. The adjustment unit 40 is a part for adjusting a resource quota in the adaptive resource allocation apparatus, and can be software, hardware, or a combination thereof, for example, a component such as an input/output interface or a processing chip that implements a resource quota adjustment function.

Based on the adaptive resource allocation apparatus, a system can adaptively adjust a resource configuration ratio of different types of services in different time segments based on a service request type received during running time and load statuses of different types of service requests, to ensure stable running of a core service (for example, a transaction service) and fully use system resources.

Generally, the time period can be set to one day including 24 time segments, and each time segment is 1 hour. Alternatively, the time period can be set to one week, and each time segment is one day; or the time period can be set to one month, and each time segment is one day; or the time period can be set to one year, and each time segment is one month. Certainly, specific duration of a time period and a corresponding time segment can be set based on actual needs. The present application sets no limitation thereto. Generally, shorter time period and shorter corresponding time segment indicate higher accuracy that the system adaptively allocates resources.

In the present application, the types of the service statements can include a transaction service statement and an analytical service statement. Certainly, the types of the service statements can further include another type of service statement, which can be set based on actual needs.

Figure 3:
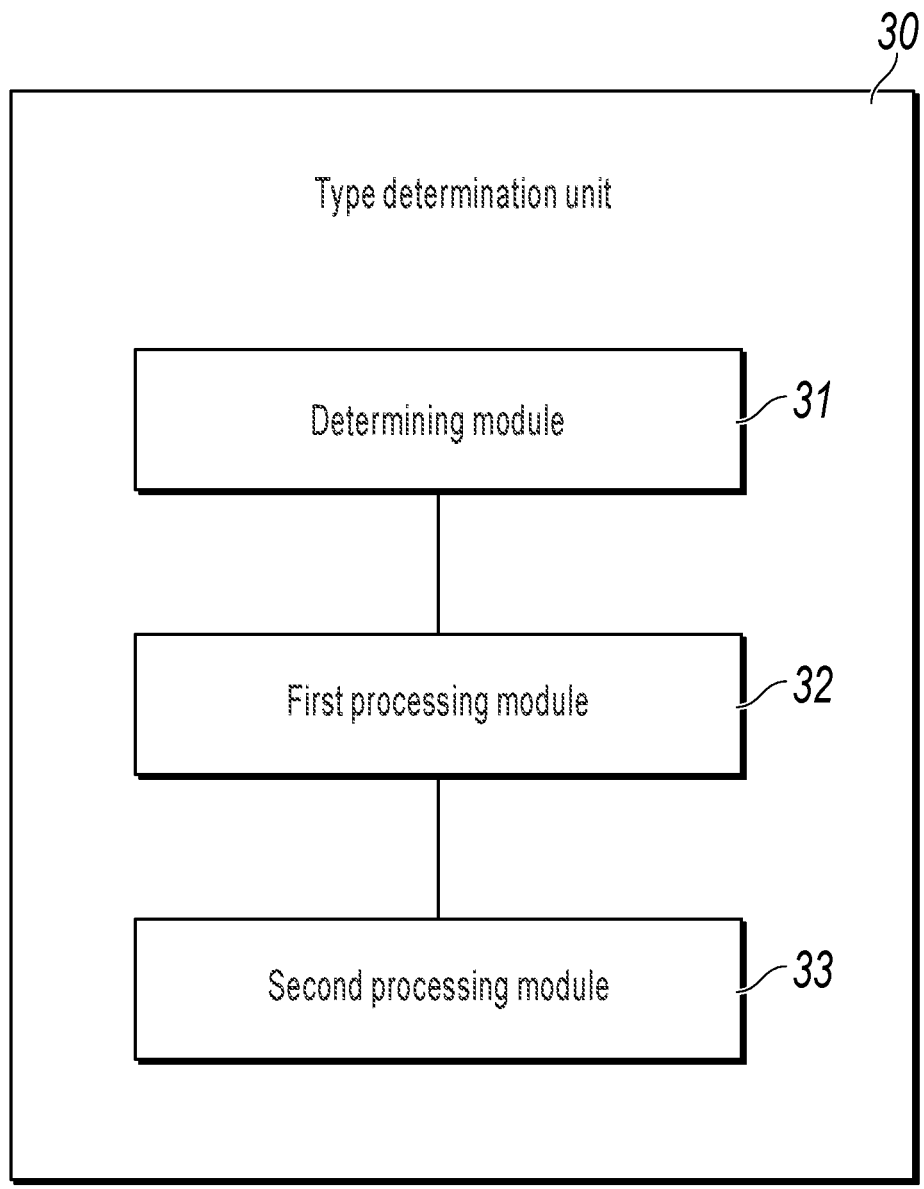
FIG. 3 is a schematic structural diagram illustrating an implementation of a type determination unit, according to the present application.

After the time segment to which each service statement belongs is determined, the type of each service statement can be determined based on the actual execution time of each service statement in each time segment by using the following preferred implementation. The apparatus can further include a threshold setting unit, configured to set an execution time threshold. The execution time threshold can be set or adjusted based on an actual situation. FIG. 3 is a schematic structural diagram illustrating an implementation of a type determination unit, according to the present application. As shown in FIG. 3, the previous type determination unit 30 can include the following: a determining module 31, configured to determine whether an actual execution time of each service statement in each time segment is greater than an execution time threshold; a first processing module 32, configured to determine that the service statement is an analytical service statement when a determining result of the determining module 31 is yes; and a second processing module 33, configured to determine that the service statement is a transaction service statement when a determining result of the determining module 31 is no. In the previous preferred implementation, the type of the service statement can be quickly and accurately determined.

Figure 4:
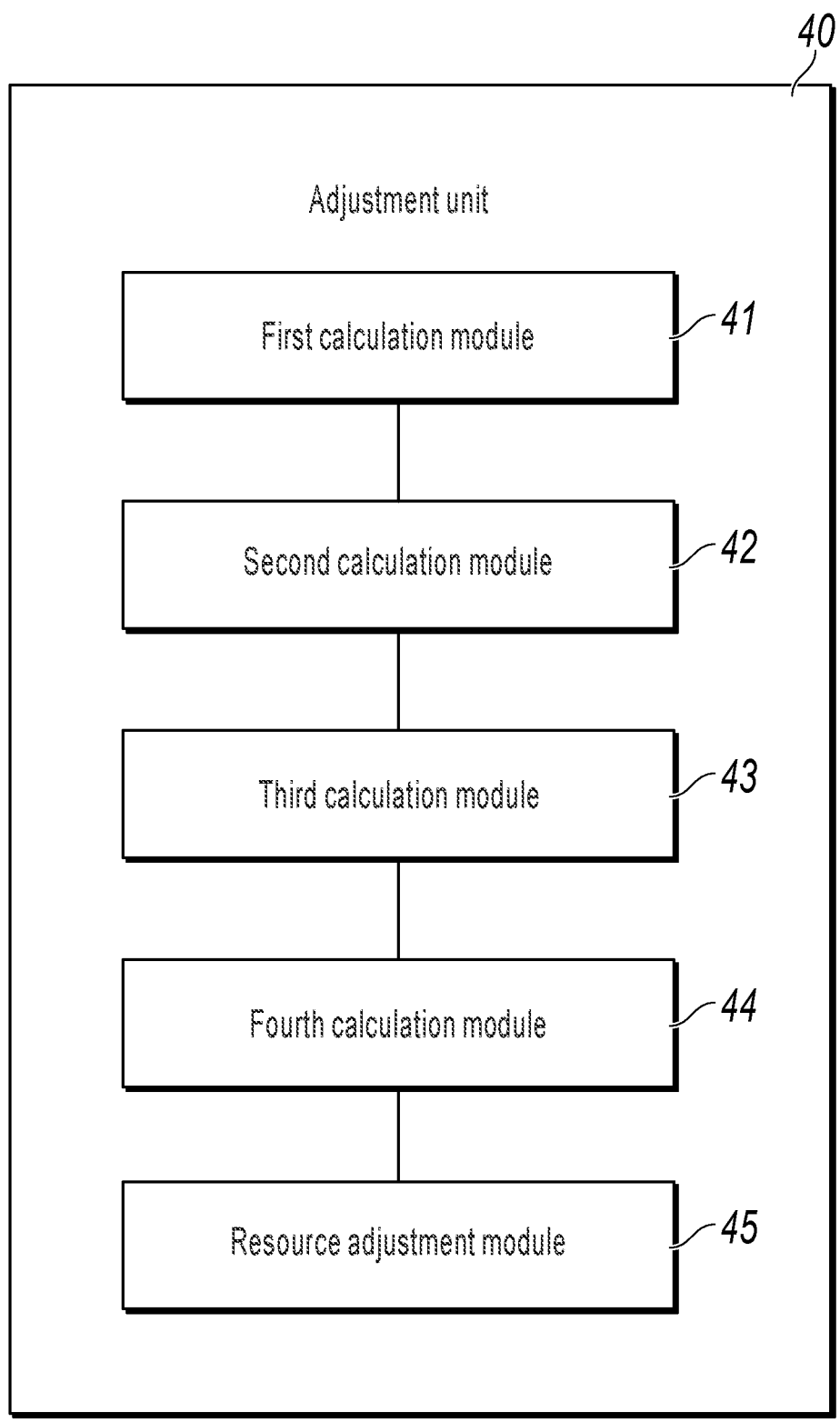
FIG. 4 is a schematic structural diagram illustrating an implementation of an adjustment unit, according to the present application.

FIG. 4 is a schematic structural diagram illustrating an implementation of an adjustment unit, according to the present application. As shown in FIG. 4, the adjustment unit 40 includes the following: a first calculation module 41, configured to calculate a sum of actual execution times of all transaction service statements in each time segment, to obtain a first actual execution time sum in each time segment; a second calculation module 42, configured to calculate a sum of response times of all the transaction service statements in each time segment, to obtain a first response time sum in each time segment; a third calculation module 43, configured to calculate a sum of actual execution times of all analytical service statements in each time segment, to obtain a second actual execution time sum in each time segment; a fourth calculation module 44, configured to calculate a sum of response times of all the analytical service statements in each time segment, to obtain a second response time sum in each time segment; and a resource adjustment module 45, configured to adjust a resource quota of the transaction service statements and a resource quota of the analytical service statements in the same time segment of the next time period, based on the first actual execution time sum, the first response time sum, the second actual execution time sum, and the second response time sum.

The previous resource adjustment module 45 can include the following: a first adjustment submodule, configured to determine whether the first response time sum is greater than the first actual execution time sum; and if yes, determine that the resource quota of the transaction service statements is excessively small, and reduce the resource quota of the analytical service statements, to be specific, reduce the resource quota of the analytical service statements to a predetermined minimum resource quota of the analytical service statements; and a second adjustment submodule, configured to determine whether the second response time sum is greater than the second actual execution time sum; and if yes, determine that the resource quota of the analytical service statements is excessively small, and reduce the resource quota of the transaction service statements, to be specific, reduce the resource quota of the transaction service statements to be greater than or equal to a maximum value of the following: a predetermined minimum resource quota of the transaction service statements and a resource quota actually consumed by the first actual execution time sum. The minimum resource quota of the analytical service statement and the minimum resource quota of the transaction service statement can be set or adjusted based on actual needs.

In the previous preferred implementation, the system can adaptively adjust resource quotas of different types of service statements based on load statuses of different types of service statements. Therefore, a resource quota adjustment operation is relatively accurately performed, to fully use system resources, ensure smooth running of different types of services, and reduce wasting of resources.

It is worthwhile to note that different types of services can have different importance degrees in different application scenarios. For example, during promotion, smooth running of a transaction service needs to be preferentially ensured. In view of this, the present application provides a preferred implementation in which the apparatus further includes a first prioritizing unit, configured to prioritize the transaction service statement and the analytical service statement, where the transaction service statement has a higher priority than the analytical service statement. In a specific scenario, if a request amount of the transaction service statement in a predetermined time exceeds a threshold, reduce a resource quota of the analytical service statement to zero until the request amount of the transaction service statement is less than the threshold. In the previous preferred implementation, different types of service statements can be prioritized based on importance degrees of the different types of services, to ensure that a type of service is preferentially run in some specific scenarios.

When the system resources are insufficient, a certain type of service can be preferentially selected for running based on priorities of different types of services. In view of this, the present application provides a preferred implementation in which the apparatus further includes a second prioritizing unit, configured to prioritize the transaction service statement and the analytical service statement; and when a quantity of system resources is less than a resource threshold, allocate a resource quota to a service statement with a high priority and/or reduce a resource quota of a service statement with a low priority to zero.

The following describes the technical solutions of the present application in further detail by using preferred implementations and accompanying drawings.

The adaptive resource allocation solution of the present application mainly includes the following parts:

(1) System Initialization Configuration

A system administrator configures initial parameters for the system, which mainly includes the following:

a. Set a determining basis used to distinguish between different types of service statements. An execution time threshold (large_query_threshold) can be predetermined based on an actual situation. If an actual execution time of a service statement is greater than the execution time threshold, it is considered that the service statement is an analytical service statement; or if an actual execution time of a service statement is less than the execution time threshold, it is considered that the service statement is a transaction service statement.

b. Set priorities of different types of service statements. Prioritization can be performed based on importance degrees of the different types of service statements, so that a service statement with a relatively high priority can be preferentially processed and/or a service statement with a relatively low priority can be actively interrupted when system resources are seriously insufficient. Generally, a transaction service is preferentially processed in a system with mixed services.

c. Set minimum resource quotas (min_oltp_time/min_olap_time) for different types of service statements. When the system runs, based on historical collected data, a very small quantity of resources are used for the service statement with the relatively high priority in an off-peak period. In view of this, a resource quota of the service statement with the relatively high priority can be properly reduced. However, to ensure service quality of the service statement with the relatively high priority, the resource quota allocated to the service statement is no less than the previously set minimum resource quota. In a special scenario such as a scenario with limited resources or a promotion scenario, a resource quota of the service statement with the relatively low priority can be reduced to zero.

(2) Running Statistics Information Collection

Figure 5:
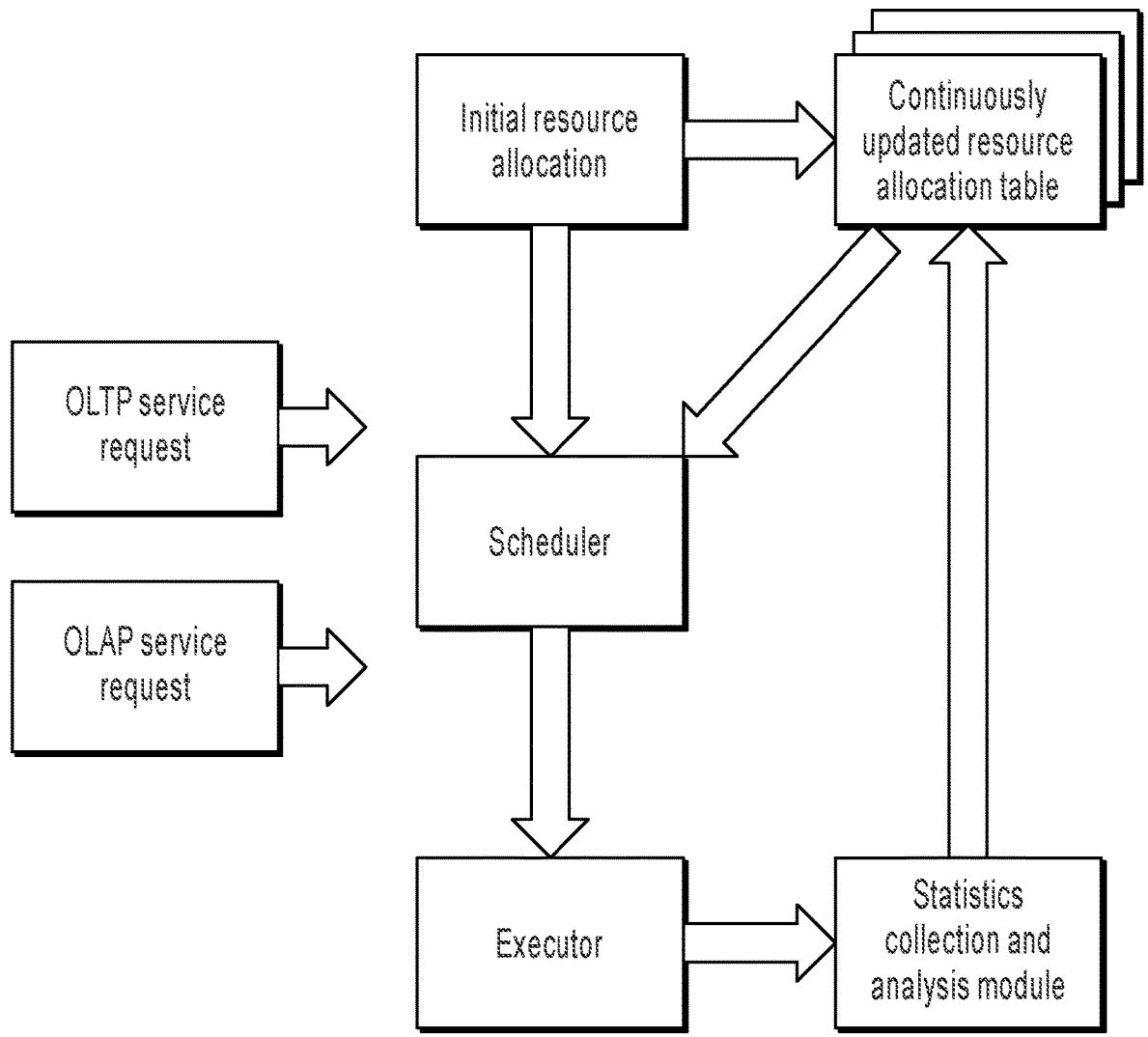
FIG. 5 is a schematic structural diagram illustrating a system of an adaptive resource allocation solution, according to the present application.

FIG. 5 is a schematic structural diagram illustrating a system of an adaptive resource allocation solution, according to the present application. As shown in FIG. 5, when the system runs, an execution device collects execution status information of a service statement when the service statement is executed. The execution status information mainly includes the following content: a time (T_start) at which the system receives a request of the service statement, an actual execution time (T_actual), and a response time (T_elapse). The actual execution time (T_actual) means a total execution time allocated by a scheduler to the service statement. If the execution ends before the time allocated by the scheduler expires, the actual execution time means an actual time used for the execution, and the response time (T_elapse) means duration starting from a time point at which the system receives the service statement to a time point at which the execution ends.

After collecting the previous information, the executor reports the triplet (T_start, T_actual, T_elapse) to a statistics collection and analysis module. Functions of the statistics collection and analysis module are equivalent to functions of the statistics collection unit, the division unit, and the type determination unit in the previous adaptive resource allocation apparatus.

It is worthwhile to note that the scheduler is a module bearing a request sent by a scheduling front end in the system, and the scheduler determines, based on resource quota statuses of different types of tasks, whether to start, pause, or even terminate execution of a certain task. The previous executor is a module actually completing a task requested by the front end in the system. In the execution process, the executor can interrupt or terminate the execution based on an instruction of the scheduler, and obtain corresponding execution status information after the execution ends.

(3) Analysis and Feedback of Collected Data

The statistics collection and analysis module collects request distribution statuses in each time segment (for example, each hour of a day) during a time period. First, the statistics collection and analysis module groups all triplets in one day based on the request time (T_start) and obtains for each group a request set of each hour: ReqSet (h0), ReqSet (h1), . . . , ReqSet (h23); and then finds all tuples with actual execution time (T_actual) less than the execution time threshold (large_query_threshold) in triplets in a request set ReqSet (hi) of each hour, to form a new set ReqSetOltp (hi). This set is a set of all transaction service statements in each time segment, and the remaining is a set ReqSetOlap (hi) of all analytical service statements in each time segment.

A sum of actual execution times (T_actual) and a sum of response times (T_elapse) in each of the two tuples ReqSetOltp (hi) and ReqSetOlap (hi) are calculated, to obtain four time values: a first actual execution time sum TotalAtimeOltp (hi), a first response time sum TotalEtimeOltp (hi), a second actual execution time sum TotalAtimeOlap (hi), and a second response time sum TotalEtimeOlap (hi). A resource usage status of the system in 1 hour can be determined based on the four time values (a continuously updated resource allocation table can be constructed), which mainly includes the following two cases:

a. Case 1: The first response time sum TotalEtimeOltp (hi)>the first actual execution time sum TotalAtimeOltp (hi)*(1+α), where α represents an acceptable statistical and timing error in the present application.

In this case, it indicates that the system has insufficient resources for executing the transaction service statement. Consequently, some requests are not executed in time or are interrupted when being executed, causing a significantly longer response time of the transaction service statement than time required for the actual execution.

b. Case 2: The second response time sum TotalEtimeOlap (hi)>the second actual execution time sum TotalAtimeOlap (hi)*(1+α).

In this case, it indicates that the system has insufficient resources for executing the analytical service statement. Consequently, some requests are not executed in time or are interrupted when being executed, causing a significantly longer response time of the analytical service statement than time required for the actual execution.

If the two cases co-exist, it indicates that the two types of service statements are not responded to in time and the system is obviously overloaded. A resource quota of a type of service statement can be reduced based on a priority, or resource quotas of the two types of service statements can be reduced based on the same ratio or different ratios.

If none of the two cases exists, it indicates that the system is lightly loaded and the two types of service statements can run smoothly.

If only one of the two cases exists, it indicates that the resource allocation in the system enables a type of service statement to be responded to in time, and no sufficient resources are available for executing the other type of service statement. In this case, resource quotas in the same time segment in a next time period (the same hour in the second day) are adjusted based on resource quotas AssignTimeOltp (hi) and AssignTimeOlap (hi) allocated by the system to the two types of service statements in the time segment.

A currently used relatively simple adjustment policy is as follows: When the resource quota of the transaction service statement is excessively small, the resource quota of the analytical service statement is reduced; and when the resource quota of the analytical service statement is excessively small, the resource quota of the transaction service statement is reduced.

In an implementation of the system, a more detailed adjustment policy can be selected: a. When the resource quota of the transaction service statement is insufficient, the resource quota of the analytical service statement can be directly reduced to a predetermined minimum resource quota (min_olap_time) of the analytical service statement. b. When the resource quota for the analytical service statement is insufficient, the resource quota of the transaction service statement is reduced by a certain percentage (for example, 10%), provided that an adjusted resource quota is greater than or equal to a maximum value in a resource quota actually consumed by the second response time sum TotalEOltp (hi) and a predetermined minimum resource quota (min_oltp_time) of the transaction service statement.

(4) Resource Quota Scheduling

In the next time period (for example, the second day), the system adjusts resource quotas, and resets resource ratios of different types of services, based on values calculated in a corresponding time segment (per hour) in a previous time period (for example, the first day) and the previously described policy. In addition, new load statuses of the two types of service statements are reported and analyzed in an execution process.

It should be noted that, in scenarios such as holiday season promotional events (for example, double 11 or Black Friday), when the transaction service has a higher priority than the transaction service, the system can determine, based on real-time collected information, whether a request amount of the transaction service statement lasting for a time segment (for example, 1 minute) exceeds a threshold, and directly reduce or cancel the resource quota of the analytical service statement in the time segment until the request amount of the transaction service statement is back to a normal level.

In the present application, resources for different types of service statements are CPU, memory, storage, and network resources required for executing a request, and CPU is the main resource in the present application. Similarly, adaptive adjustments based on storage usage, IO usage, network resources, etc. are also applicable to the technical solutions in the present application.

It can be seen from the previous description that the present application provides the following solution: After initial parameter configuration is performed on the system, a system administrator adaptively adjusts resource allocation of the system in the future corresponding time segment based on resource usage statues of different types of service statements in a past time segment, to ensure stable running of a core service and fully use system resources.

The above description in the implementations of the present application is merely an application of some implementations of the present application, and an implementation slightly modified based on some standards, models, and methods can also be used to implement the solutions in the implementations of the present application. Certainly, other non-creative changes in accordance with steps of the processing method in the implementations of the present application can still be used to implement the same application. Details are not described here.

Although the present application provides the method operation steps in the implementations or the flowcharts, more or fewer operation steps can be included based on conventional or non-creative efforts. The sequence of the steps listed in the implementations is merely one of numerous step execution sequences, and does not represent the unique execution sequence. For an actual device or client product, the steps can be executed based on the sequence illustrated in the implementations or accompanying drawings or executed in parallel (for example, in a parallel processor or multi-threaded processing environment).

The apparatuses or modules described in the previous implementations can be implemented by a computer chip or an entity, or can be implemented by a product with a certain function. For ease of description, the previous device is described by dividing the functions into various modules. Certainly, when the present application is implemented, the functions of all modules can be implemented in one or more pieces of software and/or hardware. Certainly, a module that implements a certain function can be implemented by using a combination of a plurality of submodules or subunits.

The method, apparatus, or module in the present application can be implemented by using computer readable program code. A controller can be implemented in any appropriate way. For example, the controller can take the form of, for example, a microprocessor, a processor, a computer readable medium storing computer readable program code (for example, software or firmware) that can be executed by the microprocessor or the processor, a logic gate, a switch, an application-specific integrated circuit (ASIC), a programmable logic controller, or an embedded microcontroller. Examples of the controller include but are not limited to the following microcontrollers: ARC 625D, Atmel AT91SAM, Microchip PIC18F26K20, and Silicone Labs C8051F320. A memory controller can also be implemented as a part of control logic of a memory. A person skilled in the art also knows that, in addition to implementing the controller by using the computer readable program code only, logic programming can be performed on method steps to enable the controller to implement the same function in a form of the logic gate, the switch, the ASIC, the programmable logic controller, or the embedded microcontroller. Therefore, the controller can be considered as a hardware component, and an apparatus included in the controller and configured to implement various functions can also be considered as a structure in the hardware component. Alternatively, the apparatus configured to implement various functions can even be considered as both a software module implementing the method and a structure in the hardware component.

Some modules of the apparatus in the present application can be described in the general context of a computer executable instruction executed by a computer, for example, a program module. Generally, the program module includes a routine, a program, an object, a component, a data structure, a type, etc. that executes a specific task or implements a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

It can be seen from description of the implementations that, a person skilled in the art can clearly understand that the present application can be implemented by using software and necessary hardware. Based on such an understanding, the technical solutions of the present application essentially, or the part contributing to the existing technologies can be implemented in the form of a software product or can be implemented during a data transfer implementation process. The computer software product can be stored in a storage medium, such as a ROM/RAM, a magnetic disk, or an optical disc, and includes several instructions for instructing a computer device (which can be a personal computer, a mobile terminal, a server, a network device, etc.) to perform the methods described in the implementations of the present application or some parts of the implementations.

The implementations in the present specification are described in a progressive method. For the same or similar parts in the implementations, reference can be made to each other. Each implementation focuses on a difference from other implementations. All or some of the present application can be used in many general-purpose or dedicated computer system environments or configurations, for example, a personal computer, a server computer, a handheld device, a portable device, a tablet device, a mobile communications terminal, a multiprocessor system, a microprocessor system, a programmable electronic device, a network PC, a small computer, a mainframe computer, and a distributed computing environment including any of the above systems or devices.

Although the present application is described by using the implementations, a person of ordinary skill in the art knows that many modifications and variations of the present application can be made without departing from the spirit of the present application. It is expected that the claims include these modifications and variations without departing from the spirit of the present application.

Figure 6:
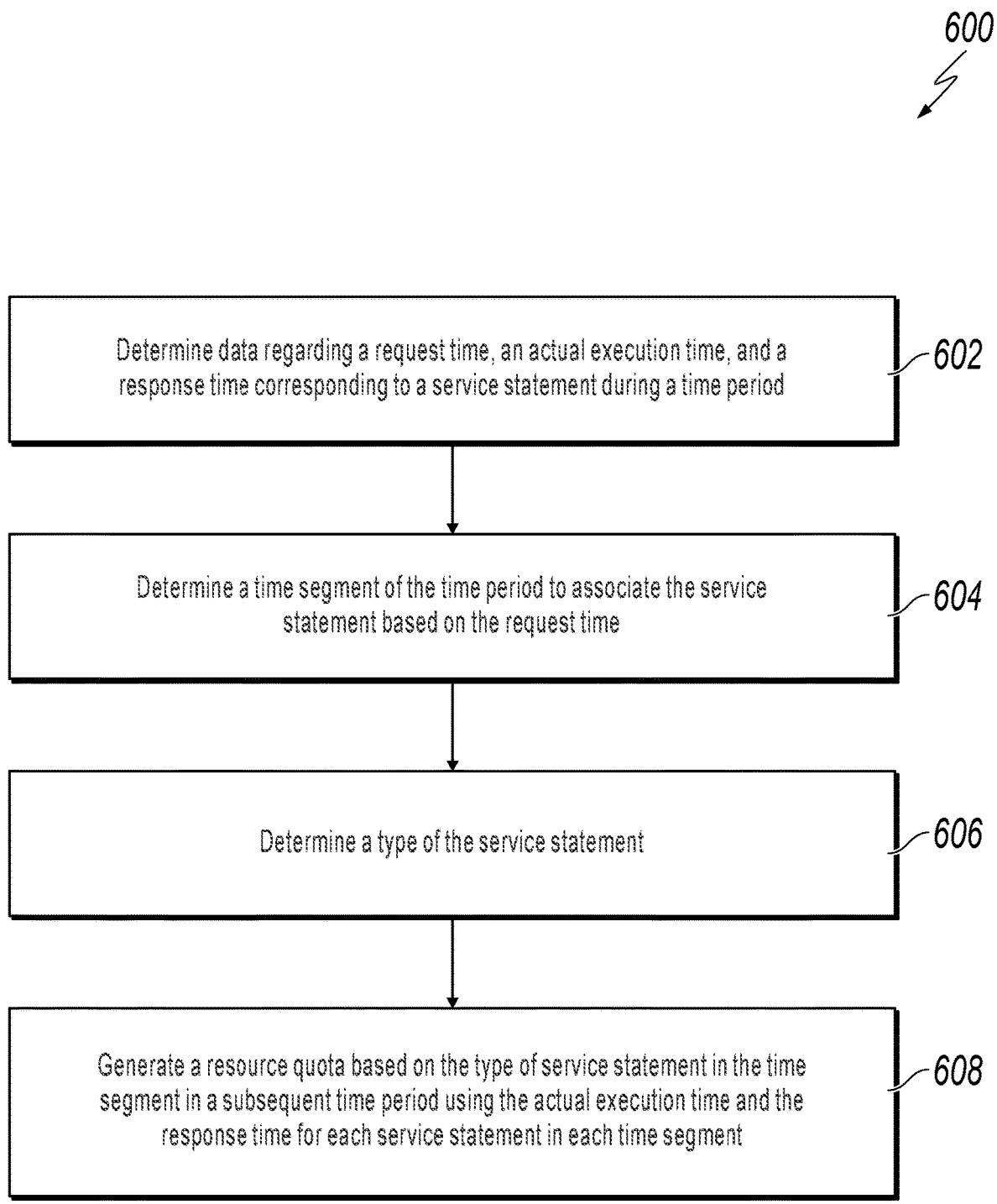
FIG. 6 is a flowchart illustrating an example of a computer-implemented method for adaptive resource allocation, according to an implementation of the present disclosure.

FIG. 6 is a flowchart illustrating an example of a computer-implemented method 600 for adaptive resource allocation, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a request time, an execution time, and a response time is determined corresponding to a service statement executed by the database system during a time period, wherein the request time is a time at which the service statement was executed by the database system, the execution time is an amount of time allocated for execution of the service statement by the database system, and the response time is an amount of time that elapsed between the request time and a time at which execution of the service statement ended. In particular, the data includes statistics that have been collected about a request time, an actual execution time, and a response time of each service statement during a time period. From 602, method 600 proceeds to 604.

At 604, a time segment of the time period is identified based on the request time. In particular, when a time segment of the request time of each service statement is determined, the system determines that the service statement belongs to the time segment. Generally, the time period can be set to one day including 24 time segments, and each time segment is 1 hour. Alternatively, the time period can be set to one week, and each time segment is one day; or the time period can be set to one month, and each time segment is one day; or the time period can be set to one year, and each time segment is one month. Certainly, specific duration of a time period and a corresponding time segment can be set based on actual needs. Generally, shorter time period and shorter corresponding time segment indicate higher accuracy that the system adaptively allocates resources. From 604, method 600 proceeds to 606.

At 606, a service type associated with the service statement is determined. The types of the service statements can include a transaction service statement and an analytical service statement. Additionally, other types of service statements can be utilized. If a resource quota of another type of service statement needs to be adaptively adjusted, the adaptive resource allocation method is also applicable to a specific implementation. From 606, method 600 proceeds to 608.

At 608, a resource quota is updated for the time segment based on the service type, the execution time, and the response time for the service statement. In particular, after the type of each service statement is determined, the resource quota corresponding to the type of service statement in the same time segment of the next time period can be adjusted based on the actual execution time and the response time of each service statement. The resource quota can be adjusted using the followed method. First, a sum of the actual execution times corresponding to each of the transaction service statements in each time segment is calculated, to obtain a first actual execution time sum in each time segment. Additionally, a sum of the response times corresponding to each of the transaction service statements in each time segment is calculated, to obtain a first response time sum in each time segment.

Additionally, a sum of the actual execution times corresponding to each of the analytical service statements in each time segment is calculated, to obtain a second actual execution time sum in each time sum. Then, the sum of response times for each of the analytical service statements in each time segment is calculated, to obtain a second response time sum in each time segment. The resource quota of the transaction service statements and the resource quota of the analytical service statements in the same time of the next time period is adjusted based on the first actual execution time sum, the first response time sum, the second actual execution time sum, and the second response time sum. From 608, method 600 stops.

The features of the present application seek to adaptively adjust resource quotas of different types of services in different time segments and to ensure stable running of a core service and fully use system resources. For example, the system is configured to determine a request time, an execution time, and a response time corresponding to a service statement executed by the database system during a time period is determined, wherein the request time is a time at which the service statement was executed by the database system, the execution time is an amount of time allocated for execution of the service statement by the database system, and the response time is an amount of time that elapsed between the request time and a time at which execution of the service statement ended. A time segment of the time period is identified based on the request time. A service type associated with the service statement is determined. A resource quota for the time segment based on the service type, the execution time, and the response time for the service statement is updated. In this method, a system can adaptively adjust a resource configuration ratio of different types of services in different time segments based on a service request type received during running time and load statuses of different types of service requests, to ensure stable running of a core service (for example, a transaction service) and fully use system resources.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for managing a resource quota in a database system, comprising:
    determining a request time, an execution time, and a response time corresponding to a service statement executed by the database system during a time period, wherein the request time is a time at which execution of the service statement by the database system begins, the execution time is an amount of time allocated for execution of the service statement by the database system, and the response time is an amount of time that elapsed between the request time and a time at which execution of the service statement ended;
    identifying a time segment of the time period based on the request time;
    setting an execution time threshold, wherein the execution time threshold is used for determining a service type associated with the service statement in the time segment;
    for the time segment, selecting a service type associated with the service statement, wherein selecting the service type comprises
        determining whether the execution time of the service statement is greater than the execution time threshold, and
        if the execution time of the service statement in the time segment is greater than the execution time threshold, selecting a first type of service statement from at least two possible service types, or
        if the execution time of the service statement in the time segment is not greater than the execution time threshold, selecting a second type of service statement from the at least two possible service types; and
    updating the resource quota for the service statement in a same time segment of a next time period based on the determined service type, the execution time, and the response time for the service statement, wherein updating the resource quota comprises adjusting allocation of resources from resources comprising a central processing unit, memory, and input/output operations per second.

2. The computer-implemented method of claim 1, wherein the service type is a transaction service or an analytical service.

3. The computer-implemented method of claim 1, further comprising prior to updating the resource quota, calculating the resource quota for the time segment.

4. The computer-implemented method of claim 3, wherein calculating the resource quota for the time segment includes:
    determining a sum of execution times for a plurality of service statements of the service type that were executed in the time segment;
    determining a sum of response times for the plurality of service statements of the service type that were executed in the time segment; and
    calculating the resource quota based on the sum of the execution times and the sum of the response times.

5. The computer-implemented method of claim 4, wherein calculating the resource quota based on the sum of the execution times, and the sum of the response times includes:
    determining that the sum of the response times is greater than the sum of the execution times; and
    in response to determining that the sum of the response times is greater than the sum of the execution times, decreasing the resource quota associated with the service type by a predetermined value.

6. The computer-implemented method of claim 4, wherein calculating the resource quota based on the sum of the execution times, and the sum of the response times includes:
   determining that the sum of the response times is less than the sum of the execution times; and
   in response to determining that the sum of response times is less than the sum of execution times, decreasing the resource quota associated with the service type by a predetermined value.

7. The computer-implemented method of claim 1, wherein the time period is one week and the time segment is a particular day during the time period.

8. A non-transitory computer-readable storage medium configured with instructions that, when executed by one or more computers, cause the one or more computers to perform operations comprising:
   determining a request time, an execution time, and a response time corresponding to a service statement executed by a database system during a time period, wherein the request time is a time at which execution of the service statement by the database system begins, the execution time is an amount of time allocated for execution of the service statement by the database system, and the response time is an amount of time that elapsed between the request time and a time at which execution of the service statement ended;
   identifying a time segment of the time period based on the request time;
   setting an execution time threshold, wherein the execution time threshold is used for determining a service type associated with the service statement in the time segment;
   for the time segment, selecting a service type associated with the service statement, wherein selecting the service type comprises
      determining whether the execution time of the service statement is greater than the execution time threshold, and
      if the execution time of the service statement in the time segment is greater than the execution time threshold, selecting a first type of service statement from at least two possible service types, or
      if the execution time of the service statement in the time segment is not greater than the execution time threshold, selecting a second type of service statement from at least two possible service types; and
   updating a resource quota for the service statement in a same time segment of a next time period based on the determined service type, the execution time, and the response time for the service statement, wherein updating the resource quota comprises adjusting allocation of resources from resources comprising a central processing unit, memory, and input/output operations per second.

9. The non-transitory computer-readable storage medium of claim 8, wherein the service type is a transaction service or an analytical service.

10. The non-transitory computer-readable storage medium of claim 8, wherein the operations further comprise:
   prior to updating the resource quota, calculate the resource quota for the time segment.

11. The non-transitory computer-readable storage medium of claim 10, wherein calculating the resource quota for the time segment includes:
   determining a sum of execution times for a plurality of service statements of the service type that were executed in the time segment;
   determining a sum of response times for the plurality of service statements of the service type that were executed in the time segment; and
   calculating the resource quota based on the sum of the execution times and the sum of the response times.

12. The non-transitory computer-readable storage medium of claim 11, wherein calculating the resource quota based on the sum of the execution times, and the sum of the response times includes:
   determining that the sum of the response times is greater than the sum of the execution times; and
   in response to determining that the sum of the response times is greater than the sum of the execution times, decreasing the resource quota associated with the service type by a predetermined value.

13. The non-transitory computer-readable storage medium of claim 11, wherein calculating the resource quota based on the sum of the execution times, and the sum of the response times includes:
   determining that the sum of the response times is less than the sum of the execution times; and
   in response to determining that the sum of response times is less than the sum of execution times, decreasing the resource quota associated with the service type by a predetermined value.

14. The non-transitory computer-readable storage medium of claim 8, wherein the time period is one week and the time segment is a particular day during the time period.

15. A system, comprising:
   one or more computers; and
   one or more computer-readable memories coupled to the one or more computers and configured with instructions that, when executed by the one or more computers, cause the one or more computers to perform operations comprising:
   determining a request time, an execution time, and a response time corresponding to a service statement executed by a database system during a time period, wherein the request time is a time at which execution of the service statement by the database system begins, the execution time is an amount of time allocated for execution of the service statement by the database system, and the response time is an amount of time that elapsed between the request time and a time at which execution of the service statement ended;
   identifying a time segment of the time period based on the request time;
   setting an execution time threshold, wherein the execution time threshold is used for determining a service type associated with the service statement in the time segment;
   for the time segment, selecting a service type associated with the service statement, wherein selecting the service type comprises
      determining whether the execution time of the service statement is greater than the execution time threshold, and
      if the execution time of the service statement in the time segment is greater than the execution time threshold, selecting a first type of service statement from at least two possible service types, or
      if the execution time of the service statement in the time segment is not greater than the execution time threshold, selecting a second type of service statement from at least two possible service types; and updating a resource quota for the service statement in a same time segment of a next time period based on the determined service type, the execution time, and the response time for the service statement, wherein updating the resource quota comprises adjusting allocation of resources from resources comprising a central processing unit, memory, and input/output operations per second.

16. The system of claim 15, wherein the service type is a transaction service or an analytical service.

17. The system of claim 15, wherein the operations further comprise:

prior to updating the resource quota, calculate the resource quota for the time segment.

18. The system of claim 17, wherein calculating the resource quota for the time segment includes:

determining a sum of execution times for a plurality of service statements of the service type that were executed in the time segment;

determining a sum of response times for the plurality of service statements of the service type that were executed in the time segment; and calculating the resource quota based on the sum of the execution times and the sum of the response times.

19. The system of claim 18, wherein calculating the resource quota based on the sum of the execution times, and the sum of the response times includes:

determining that the sum of the response times is greater than the sum of the execution times; and in response to determining that the sum of the response times is greater than the sum of the execution times, decreasing the resource quota associated with the service type by a predetermined value.

20. The system of claim 18, wherein calculating the resource quota based on the sum of the execution times, and the sum of the response times includes:

determining that the sum of the response times is less than the sum of the execution times; and in response to determining that the sum of response times is less than the sum of execution times, decreasing the resource quota associated with the service type by a predetermined value.

* * * * *